(12) United States Patent
Li et al.

(10) Patent No.: US 10,340,986 B2
(45) Date of Patent: Jul. 2, 2019

(54) FREQUENCY RESOURCE ALLOCATION IN MU-MIMO SYSTEMS

(71) Applicant: Ping Liang, Irvine, CA (US)

(72) Inventors: Boyu Li, Irvine, CA (US); Dengkui Zhu, Beijing (CN); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 15/576,238

(22) PCT Filed: Jun. 15, 2016

(86) PCT No.: PCT/US2016/037625
§ 371 (c)(1),
(2) Date: Nov. 21, 2017

(87) PCT Pub. No.: WO2017/003689
PCT Pub. Date: Jan. 5, 2017

(65) Prior Publication Data
US 2018/0152226 A1    May 31, 2018

Related U.S. Application Data

(60) Provisional application No. 62/185,676, filed on Jun. 28, 2015.

(51) Int. Cl.
*H04B 7/0452* (2017.01)
*H04B 7/00* (2006.01)
*H04B 7/02* (2018.01)
*H04L 12/26* (2006.01)
*H04L 5/00* (2006.01)
*H04L 5/14* (2006.01)
(Continued)

(52) U.S. Cl.
CPC ............. *H04B 7/0452* (2013.01); *H04B 7/00* (2013.01); *H04B 7/02* (2013.01); *H04L 5/006* (2013.01); *H04L 5/0037* (2013.01); *H04L 5/0057* (2013.01); *H04L 5/14* (2013.01); *H04L 43/00* (2013.01); *H04W 88/02* (2013.01); *H04W 88/08* (2013.01)

(58) Field of Classification Search
CPC .......... H04B 7/0452; H04B 7/00; H04B 7/02; H04L 5/0037; H04L 5/0057; H04L 5/006; H04L 5/14; H04L 43/00
See application file for complete search history.

(56) References Cited

U.S. PATENT DOCUMENTS

| 2006/0039318 | A1* | 2/2006 | Oh | H04L 5/0007 370/328 |
| 2010/0128687 | A1* | 5/2010 | Oteri | H04L 1/1887 370/329 |

(Continued)

*Primary Examiner* — Pao Sinkantarakorn
*Assistant Examiner* — Stephen N Steiner
(74) *Attorney, Agent, or Firm* — Guosheng Wang; United States Research and Patent Firm

(57) ABSTRACT

This invention presents a method for frequency resource allocation in a MU-MTMO system comprising assigning UEs with CQI higher than a predefined value and/or CEE lower than a predefined value and/or SII lower than a predefined value to a first group and the rest UEs to a second group, allocating different frequency resource to each group, and applying different precoding or decoding algorithm to each group.

9 Claims, 2 Drawing Sheets

(51) Int. Cl.
*H04W 88/02* (2009.01)
*H04W 88/08* (2009.01)

(56) References Cited

U.S. PATENT DOCUMENTS

2015/0372741 A1* 12/2015 Kim .................... H04B 7/0413
                                                    370/329
2017/0099658 A1* 4/2017 Shattil .................. H04L 63/061

* cited by examiner

FREQUENCY RESOURCE ALLOCATION IN MU-MIMO SYSTEMS

This application claims the benefit of U.S. Provisional Application No. 62/185,676, filed on Jun. 28, 2015.

FIELD OF THE INVENTION

The field of the invention is wireless communications. The presented invention relates to methods for allocating Frequency Resource (FR) in multi-user wireless communication systems, and in particular to strategies of user grouping in massive Multiple-Input Multiple-Output (MIMO) systems. In other words, this invention provides a universal user grouping strategy that could be implemented in massive MIMO systems to improve performance.

BACKGROUND

A massive MIMO systems scales up conventional MIMO systems by possibly orders of magnitude, i.e., hundreds of antennas at a Base-Station (BS) to simultaneously serve tens of User Equipments (UEs) in the same time-frequency resource. Such a system may provide tremendous advantages [1]-[3]. With the capabilities of aggressive spatial multiplexing and great array gains, a massive MIMO system may achieve capacity increase and energy efficiency improvement simultaneously. In addition, it can be built with inexpensive and low-power components. It also has the potential to significantly reduce the latency of the air interface, simplify the media-access layer, as well as increase the robustness to both unintentional artificial interference and intended jamming. In general, massive MIMO systems are considered in Time Division Duplex (TDD) mode, taking advantages of the channel reciprocity between the uplink and downlink, although Frequency Division Duplex (FDD) is also possible as in [4], or our patent application PCT/US14/71752.

In a massive MIMO system, a BS selects users at each scheduling Transmission Time Interval (TTI) and communicates with them in the same FR. Different precoding algorithms for the downlink and decoding algorithms for the uplink could be employed at each TTI, e.g., Conjugate Beamforming (CB) or Zero-Forcing Beamforming (ZFB) for the downlink and Maximal-Ratio Combining (MRC) or Zero-Forcing Decoding (ZFD) for the uplink. Since the UEs associated to a BS have different channel conditions, it is advantageous to divide UEs into different groups based on their channel conditions and then allocate the FR to each group. However, a proper UE grouping and FR allocation strategy is currently lacking for massive MIMO systems. Prior arts put users of diverse channel conditions in the same FR, and may suffer significant loss of sum capacity and/or reduction of data rate of UEs with excellent channel conditions to accommodate UEs with bad channel conditions.

This invention presents embodiments that provide a strategy for UE grouping and FR allocation in massive MIMO systems.

OBJECTS OF THE INVENTION

It is an object of this invention to provide a UE grouping and FR allocation strategy based on UE channel conditions for massive MIMO systems.

The other object of this invention is to specify certain parameters of UE channel conditions required for the strategy and their acquisition methods.

SUMMARY OF THE INVENTION

In order to properly group UEs to associate with a BS, certain required parameters of UE channel conditions are first considered, i.e., Channel Quality Information (CQI), Channel Estimation Error (CEE), and UE Speed Indication Information (SII). Then, based on the three parameters, a universal user grouping strategy for massive MIMO systems is presented. Moreover, the general methods to acquire the three considered parameters are also provided.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION OF THE PREFERRED EMBODIMENTS

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter, a pilot signal may mean a signal transmitted by one antenna for the purpose of estimating the channel between the transmitting antenna and one or more receiving antennas. It may also be called a reference signal, a channel estimation signal or a test signal.

In massive MIMO systems, several precoding and decoding algorithms for the downlink and uplink respectively could be employed. Among them, some could offer high performance but demand more on channel conditions, e.g., ZFB for the downlink and ZFD for the uplink, while others demand less on channel conditions but could only offer acceptable performance, e.g., CB for the downlink and MRC for the uplink. In practice, the UEs associated to a BS could have various channel conditions. As a result, it is expected that applying different algorithms for different UE groups based on UE channel conditions is advantageous over without UE grouping.

There are several channel parameters that could be based on to group UEs. Three important channel parameters are listed below.

CQI provides information on the level of channel quality for each UE. Some algorithms such as ZFB for the downlink and ZFD for the uplink are more advantageous with high CQI, while others such as CB for the downlink and MRC for the uplink are more advantageous with low CQI.

CEE provides information on the error in channel estimation for each UE. Some algorithms such as CB for the downlink and MRC for the uplink are more robust against CEE, while others such as ZFB for the downlink and ZFD for the uplink are less robust against CEE.

SII provides information on the speed for each UE. Note that high speed indicates small coherence time and vice versa. Some algorithms such as ZFB for the downlink and ZFD for the uplink are more advantageous with large coherence times thereby low SII, while others such as CB for the downlink and MRC for the uplink are more advantageous with small coherence times thereby high SII.

Figure 1:
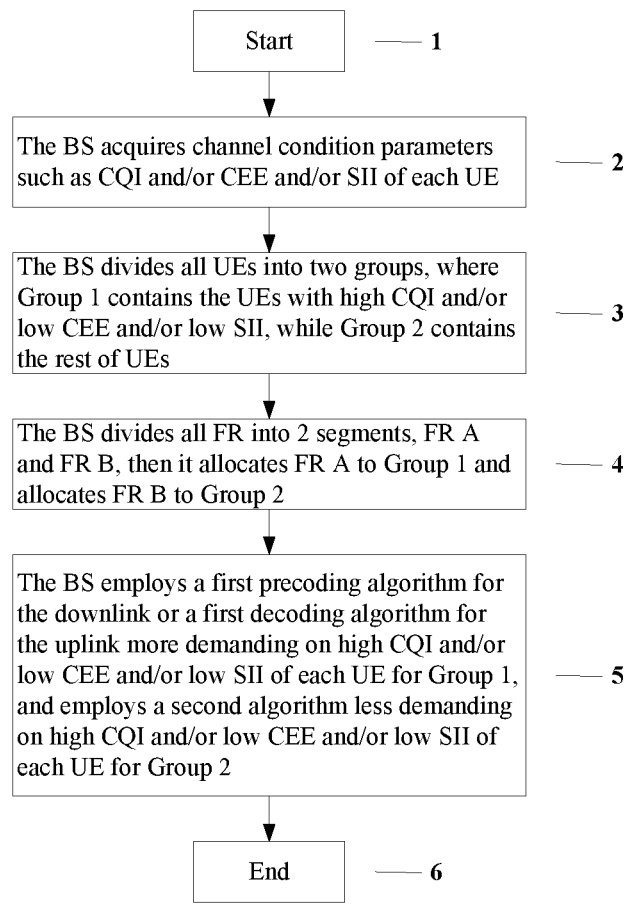
FIG. 1 shows the flowchart of an embodiment for frequency resource allocation.
Figure 2:
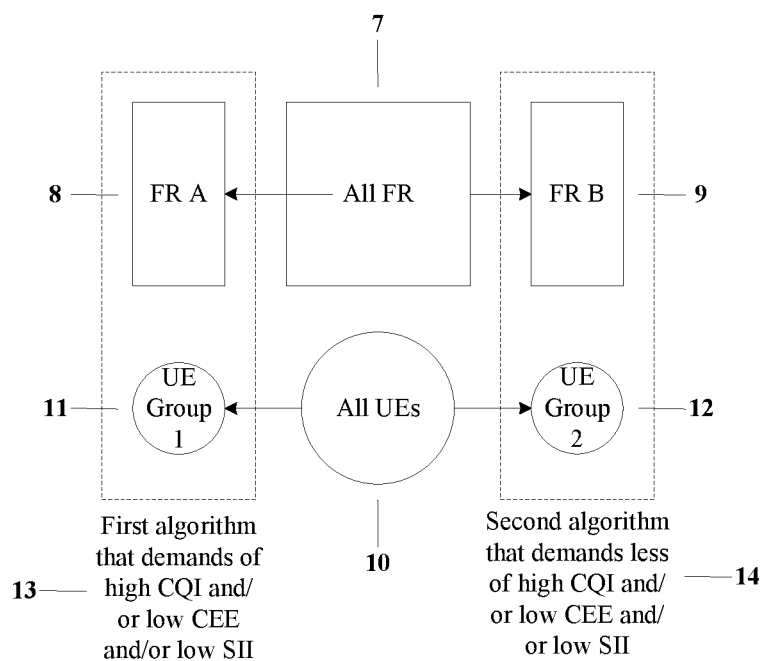
FIG. 2 shows a graphical illustration of an embodiment for frequency resource allocation.

Based on channel parameters such as CQI and/or CEE and/or SII, the BS groups UEs using the method below, which is also presented in FIG. 1 and FIG. 2.

After the process starts 1, the BS acquires channel condition parameters such as CQI and/or CEE and/or SII of each UE 2.

The BS divides all UEs 10 into two groups, where Group 1 11 has the UEs with high CQI and/or low CEE and/or low SII, while Group 2 12 has the rest of UEs 3.

The BS divides all FR 7 into 2 segments, FR A 8 and FR B 9, then it allocates FR A to Group 1 and allocates FR B to Group 2 4.

The BS employs a first precoding algorithm 13 for the downlink or a first decoding algorithm for the uplink demanding of high CQI and/or low CEE and/or low SII of each UE for Group 1, and employs a second algorithm 14 less demanding of high CQI and/or low CEE and/or low SII of each UE for Group 2 5, before the process ends 6.

The method mentioned above can be extended to grouping UEs into more than two groups and allocating a segment FR to each group. Each group has its own ranges for CQI and/or CEE and/or SII. The premise of dong so is that by choosing a proper precoding algorithm for the downlink or a proper decoding algorithm for the uplink for each UE group, it leads to greater sum-rate for each UE group and/or smaller differences among the post Signal-to-Interference-plus-Noise-Ratios (SINRs) of the UEs in each group and/or other specific purposes.

The above method could be applied in both TDD and FDD modes.

More frequency bandwidth may be allocated to a FR if the throughput demand of a user group increases, or the throughput demand of one user group becomes higher relative to the other user group.

Each FR may be one continuous frequency segment, or may be multiple non-contiguous segments, to accommodate carrier aggregation.

As the BS obtains new channel information of the UEs, a UE may be moved from one group to another group as its CQI and/or CEE and/or SII changes.

At times or intervals in a frame or sub-frame, or upon receiving a control signal from a BS, as specified in a communication protocol between the BS and the UEs, a UE sends a pilot or test signal to the BS and the BS uses the received signal to estimate the CQI and/or CEE and/or SII of the UE.

In another embodiment, a BS sends a pilot or test signal to UEs and the UEs feed back their CQI and/or CEE and/or SII to the BS.

In one embodiment, the BS estimates the CEE, e.g., using the CQI of a UE.

In another embodiment, a UE estimates the CEE, e.g., using its CQI, and feeds back the information to the BS.

In one embodiment, a UE estimates its SII, e.g., using the variance of CQI, and feeds back the information to the BS.

In another embodiment, the BS estimates the SII of a UE, e.g., using the variance of the CQI of the UE.

The SII only needs to be roughly classified instead of accurately measured, so it may be acquired by comparing the CQI variance with predefined thresholds which roughly reflects the mobile speed of a UE.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for frequency resource allocation in a MU-MIMO system comprising
    obtaining estimation of the Channel Estimation Error (CEE) and/or Speed Indication Information (SII) of User Equipment (UEs) by having the UEs send pilot or test signals to the base station (BS) and the BS estimates the CEE and/or SII of the UEs using the received signals from the UEs, or having the BS send a pilot or test signal to UEs and having the UEs feed back their CEE and/or SII to the BS;
    assigning UEs with CEE lower than a predefined value and/or SII lower than a predefined value to a first group and the rest UEs to a second group;
    allocating a first frequency resource to the first group and a second frequency resource to the second group;
    selecting and applying a first precoding algorithm for the downlink or a first decoding algorithm for the uplink that is more demanding on low CEE and/or low SII on transmissions in the first frequency resource; and
    selecting and applying a second precoding algorithm for the downlink or a second decoding algorithm for the uplink that is less demanding on low CEE and/or low SII on transmissions in the second frequency resource,
    wherein the first and second precoding algorithms and the first and second decoding algorithms are selected to produce greater sum-rate for each UE group, or smaller differences among the post Signal-to-Interference-plus-Noise-Ratios (SINRs) of the UEs in each group.

2. The method in claim 1 further comprising dividing the UEs into more than two groups based on the ranges of their CEE and/or SII and allocating a frequency resource to each group to achieve one or more specific performance measure.

3. The method in claim 1 wherein the MU-MIMO system operates in TDD mode.

4. The method in claim 1 wherein the MU-MIMO system operates in FDD mode.

5. The method in claim 1 further comprising re-allocating the frequency resources to the first and second groups if the ratio of throughput demands of the two groups changes.

6. The method in claim 1 wherein a frequency resource includes multiple contiguous or non-contiguous segments.

7. The method in claim 1 further comprising updating new channel information at the BS; and moving a UE from one group to another group as its CEE and/or SII changes.

8. The method in claim 1 further comprising a UE or BS estimating the CEE using a Channel Quality Indicator (CQI).

9. The method in claim 1 further comprising a UE or BS estimating the SII by comparing the variance of CQI with predefined thresholds to group SIIs.

\* \* \* \* \*